United States Patent [19]

Callaghan

[11] 3,999,074
[45] Dec. 21, 1976

[54] FIBER-OPTIC PHOTOELECTRIC POWER CONTROL DEVICE

[76] Inventor: James M. Callaghan, Code 333 Philadelphia Naval Shipyard, Philadelphia, Pa. 19112

[22] Filed: Aug. 2, 1973

[21] Appl. No.: 385,128

[52] U.S. Cl. ............................ 250/551; 250/227
[51] Int. Cl.² ................. G02B 27/00; H01J 5/16
[58] Field of Search ............... 250/551, 227, 225; 350/96 R, 96 B; 200/168 G

[56] References Cited
UNITED STATES PATENTS

| | | | |
|---|---|---|---|
| 3,195,405 | 7/1965 | Clark et al. | 250/227 X |
| 3,224,279 | 12/1965 | Galli et al. | 250/227 X |
| 3,335,367 | 8/1967 | Skooglund et al. | 250/227 X |
| 3,385,945 | 5/1968 | Tums | 200/168 G |
| 3,393,800 | 7/1968 | Durand, Jr. | 250/227 X |
| 3,394,976 | 7/1968 | Hawkins | 250/227 |
| 3,407,305 | 10/1968 | Sterry | 250/225 |
| 3,588,512 | 6/1971 | Hollien | 250/229 |
| 3,612,882 | 10/1971 | Sheppard | 250/227 X |
| 3,624,404 | 11/1971 | Hines | 250/227 X |
| 3,765,776 | 10/1973 | Bravenel | 250/227 X |

Primary Examiner—Alfred E. Smith
Attorney, Agent, or Firm—R. S. Sciascia; Charles D. B. Curry

[57] ABSTRACT

A power control system using fiber optics and photoelectric devices for remotely and safely controlling power to a load. The system includes a power control device, a light controller and fiber optics. The power control device includes a light generator, a light sensitive device and an electronic switch. The electronic switch controls the power to the load in response to the electrical output of the light sensitive device. The light from the light generator is transmitted to the input of the light controller by a fiber optics line. The light from the output of the light controller is connected to the input of the light sensitive device by another fiber optics line. The light sensitive device converts the light signal at its input to an electrical output signal that controls the electronic switch that controls power to the load. The light controller can transmit all of the light, block all of the light, or variably modulate the light and thereby remotely and safely control the load in any desired manner.

3 Claims, 8 Drawing Figures

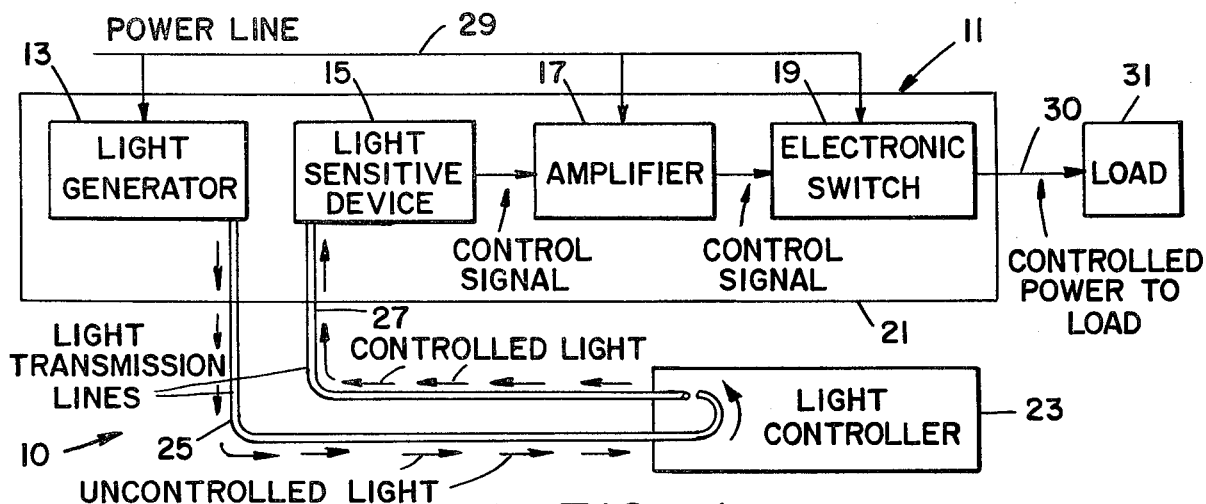
FIG_1
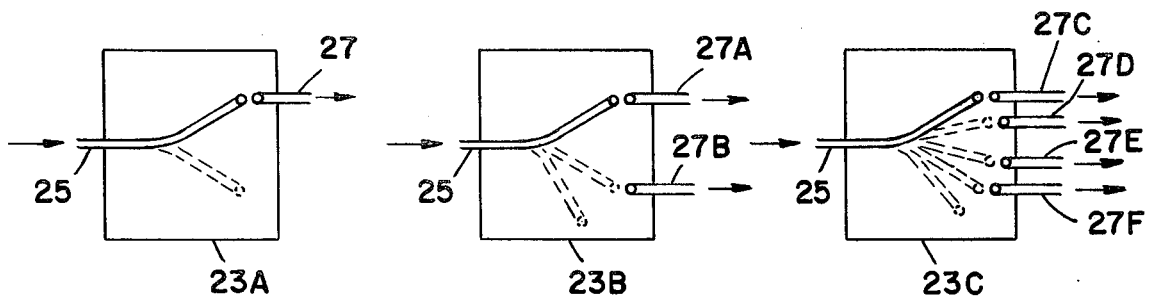
FIG_2A   FIG_2B   FIG_2C
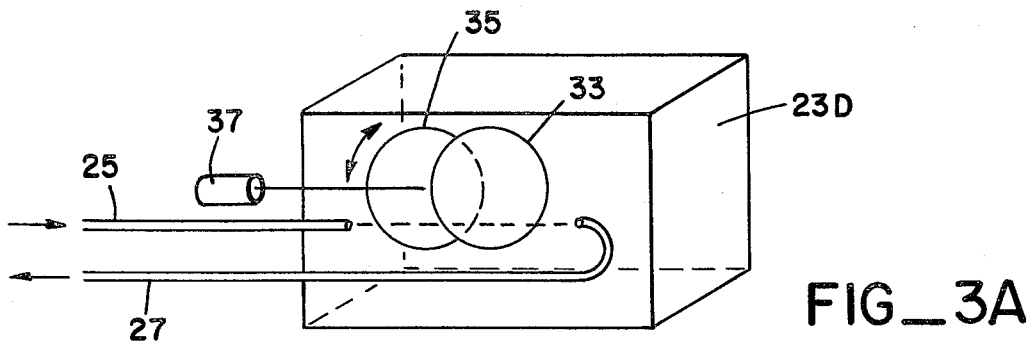
FIG_3A
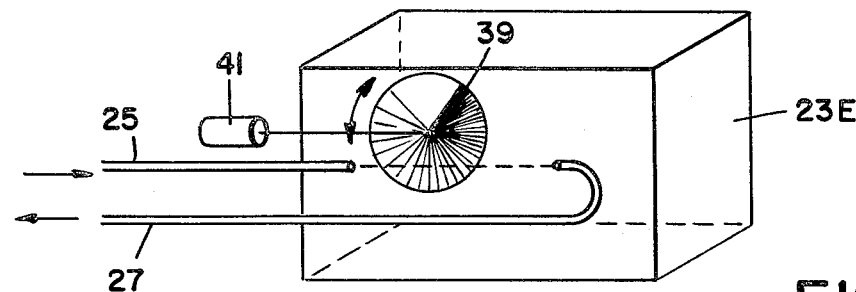
FIG_3B

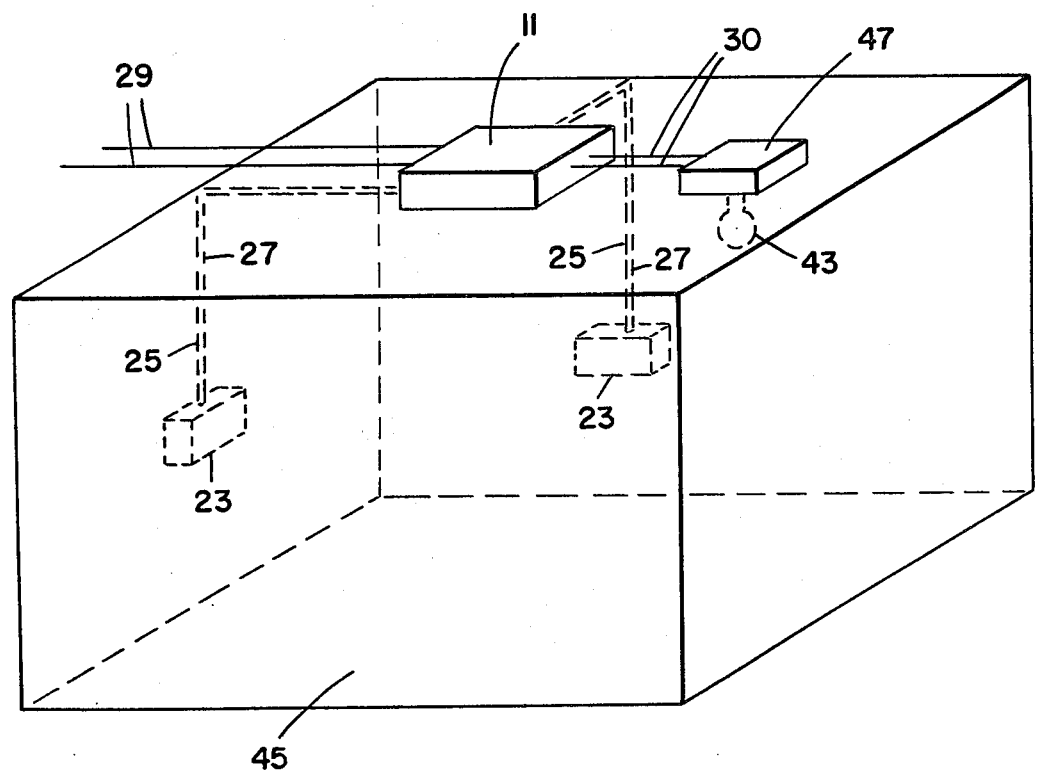
FIG_4
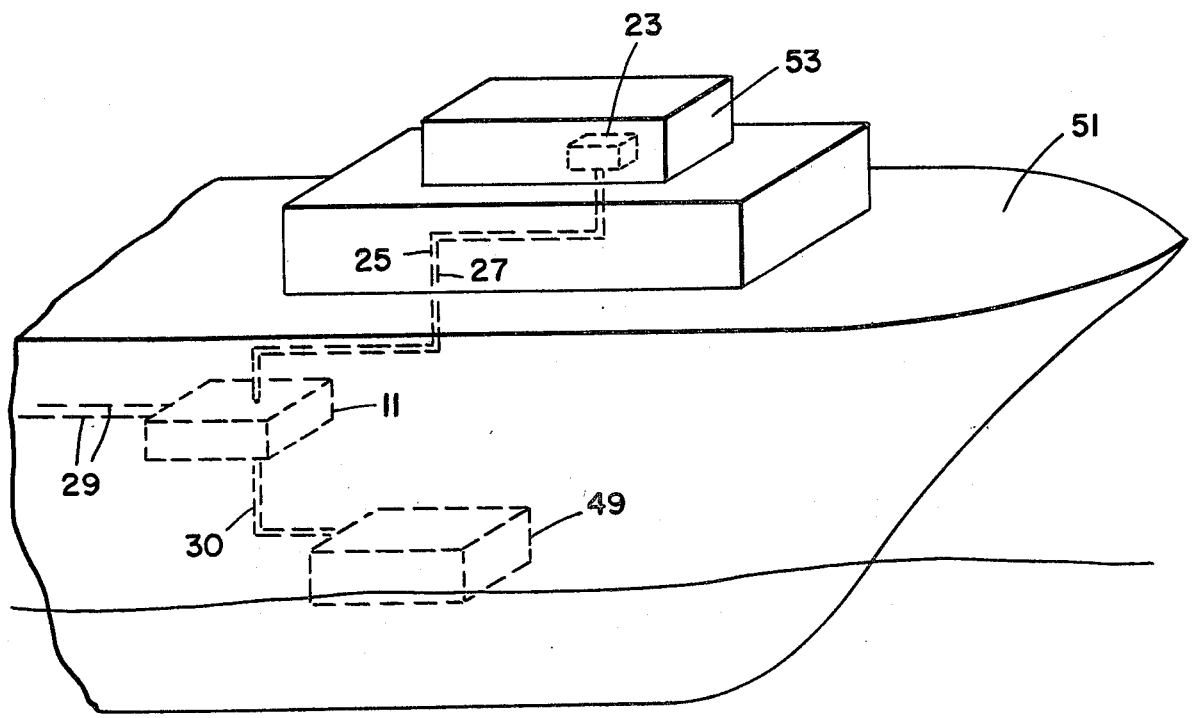
FIG_5

FIBER-OPTIC PHOTOELECTRIC POWER CONTROL DEVICE

STATEMENT OF GOVERNMENT INTEREST

The invention described herein may be manufactured and used by or for the Government of the United States of America for government purposes without the payment of any royalties thereon or therefor.

BACKGROUND OF THE INVENTION

1. Field of the Invention

The present invention relates to a power control device and more particularly to a fiber-optic photoelectric power control device that employs no electrical switches.

2. Description of the Prior Art

The normal methods of controlling power to a load such as a light, motor or electronic equipment have been with electrical wiring from the load to an electrical switch. Some methods use the principal of the ordinary power switch or relays controlled by low voltage switches. All of these methods have electricity in the control lines and switches which can cause explosions in an explosive atmosphere and fatal shocks if in or near water. Security problems can also arise due to the electromagnetic field given off by the control wires due to the electricity in them. Another problem with the old methods is the costly cableing and heavy switches which must be used for safety.

The present invention overcomes these disadvantages by controlling the power to a load at a distance from that load. The device can be operated in and under water, in an explosive atmosphere, and under low pressure such as in a high flying aircraft. The reason the present invention can be operated under these conditions is that it is an all solid state device having no ordinary switches or relays, and there is no electricity in the control line or the control switch which the operator uses to control the power to a load which may be located a few hundred feet away.

SUMMARY OF THE INVENTION

A power control system using fiber optics and photoelectric devices for remotely and safely controlling power to a load. The system includes a power control device, a light controller and fiber optics. The power control device includes a light generator, a light sensitive device, and an electronic switch. The electronic switch controls the power to the load in response to the electrical output of the light sensitive device. The light from the light generator is transmitted to the input of the light controller by a fiber optics line. The light from the output of the light controller is connected to the input of the light sensitive device by another fiber optics line. The light sensitive device converts the light signal at its input to an electrical output signal that controls the electronic switch that controls power to the load. The light controller can transmit all of the light, block all of the light or variably modulate the light and thereby remotely and safely control the load in any desired manner.

STATEMENT OF THE OBJECTS OF THE INVENTION

An object of the present invention is to provide a control system that controls the power to a load at a distance from the load.

Another object of the present invention is to provide a power control device that uses fiber optics and photoelectric techniques.

Still another object is to provide an inexpensive, safe and reliable power control device.

Other objects, advantages and novel features of the present invention will become apparent from the following detailed description of the invention when considered in conjunction with the accompanying drawings wherein:

BRIEF DESCRIPTION OF THE DRAWINGS

FIG. 1 is a schematic diagram of the power control system of the present invention;

FIGS. 2A, 2B and 2C are schematic drawings of different embodiments of the light controller used in the power control system of FIG. 1;

FIGS. 3A and 3B are schematic drawings of different embodiments of the light controller used in the power control system of FIG. 1;

FIG. 4 is a schematic drawing of the power control system as used in a confined room; and FIG. 5 is a schematic diagram of the power control system as used on a ship.

DESCRIPTION OF THE PREFERRED EMBODIMENT

In FIG. 1 is illustrated one embodiment of the power control system 10 of the present invention. The power control system 10 includes power control device 11, light controller 23 and light transmission lines 25 and 27. The power control device 11 of FIG. 1 includes light generator 13, light sensitive device 15, amplifier 17 and electronic switch 19. Amplifier 17 is illustrated in dotted lines since it may or may not be needed, depending upon the power output of light sensitive device 15 and the power input requirements of electronic switch 19. Light generator 13, light sensitive device 15, amplifier 17, if needed, and electronic switch 19 of power control device 11 are preferably mounted within chassis 21. Located remotely from the elements within chassis 21 is light controller 23. The light output of light generator 13 is transmitted through light transmission line 25, which is preferably a fiber-optics line, to the input of light controller 23. The output of light controller 23 is transmitted through light transmission line 27, which is preferably a fiber-optics line, to the input of light sensitive device 15. Electrical power for the system is obtained from power line 29. Power line 29 is operatively connected to light generator 13 to provide energy for generating light that is then transmitted through light transmission line 25 to light controller 23. Power line 29 is also operatively connected to the power input of electronic switch 19, the output of which is connected through control power line 30 to a remotely located load 31. The light generator 13 may be, for example, a light bulb or a light emitting diode. A light emitting diode or a group of light emitting diodes are preferable because of their long life and low heat emission. Greater light output from light generator 13 may be required when light transmission lines 25 and 27 are increased in length due to light attenuation in these lines. The power to light generator 13 is preferably D.C. so that the light will be of constant intensity. However, it may be directly connected to an A.C. power line, such as power line 29, in certain situations. The light sensitive device 15 may be a light sensitive detector, such as a photodetector, that generates an electrical output signal from the light energy received. Light sensitive device 15 may be of the type that requires external electrical power.

The function of light controller 23 is to transmit, block or modulate the light transmitted through light transmission lines 25 and 27 from light generator 13 to light sensitive device 15. As schematically illustrated in FIGS. 2A, 2B and 2C the light controller 23 is illustrated as a light switch that may have single or multiple outputs. In FIG. 2A is illustrated a single pole single output light switch 23A wherein when the switch is closed, as shown in solid lines, the light is transmitted from light transmission line 25 to light transmission line 27. When the switch is opened, as shown in dotted lines, the light is blocked and not transmitted from line 25 to line 27. In FIG. 2B is illustrated a double throw two output light switch 23B. In this embodiment the light from line 25 may be selectively transmitted to either line 27A or 27B or it may be blocked as indicated in the lower dotted line position. In FIG. 2C is illustrated a multiple output switch 23C. In this embodiment the light from line 25 may be selectively transmitted to either line 27C, 27D, 27E or 27F or it may be blocked as indicated in the lower dotted line position.

Other embodiments of the light controller 23 are illustrated in FIGS. 3A and 3B. In these embodiments the light controller functions as a light modulator. In the FIG. 3A embodiment light modulator 23D includes filter 33 and 35 that are polarized and are positioned in the light path between light lines 25 and 27. Filter 33 is stationary and filter 35 is rotatable by means of control knob 37. When the lines of both filters are parallel, maximum light is transmitted. Upon rotating filter 35 the transmitted light is progressively modulated until all light is blocked when the filter lines are perpendicular. In the FIG. 3B embodiment light modulator 23E includes a variable opaque filter 39 positioned in the light path between light lines 25 and 27. Filter 39 is rotatable by control knob 41. Upon rotating filter 39 from the clear to the opaque position the transmitted light progressively modulates from maximum transmitted light to no transmission of light. It will be obvious to one skilled in the art that other types of light attenuating or modulation techniques may be employed.

In FIG. 4 is schematically illustrated the power control system of the present invention for controlling a light 43 in a room 45 which may contain explosive gas, for example. In this embodiment the power control device 11, the power lines 29, the control power lines 30 and light fixture 47 are preferably located outside the room with only the bulb or light from the bulb extending into the room. It is also possible to put all of this equipment within the room since none of the equipment will cause electrical arcing. Two light controllers 23 are shown located within the room 45. Fiber optic lines 25 and 27 interconnect the light controllers 23 with the power control device 11 for controlling the electrical power applied to light bulb 43. It should be particularly noted that the light may be controlled by either of switches 23 from within the room, and yet, there is no electrical power hazard within the room that would otherwise be present.

In FIG. 5 is illustrated the power control system of the present invention for remote control of electronic or power equipment 49 on a ship 51. The power control device 11 is preferably positioned near the electronic equipment 49 for safety to avoid stringing unnecessary electrical lines and to minimize power losses. The light controller 23 is located in the ship's bridge 53, for example, and is connected to the power control device 11 by fiber optic lines 25 and 27. From this it can be seen that control of electronic or power equipment 49 may be affected from the ship's bridge without stringing electrical power lines which are often a hazard to the ship.

It should be noted that when the light controller provides only an "on" or "off" switching action that it is preferable to use a zero crossing synchronous switch to eliminate RF generated interference. However, it will be obvious that other techniques can be provided so long as RF signals do not radiate. When the light controller is used to provide variable power to the load, by modulating the transmitted light, then it is necessary to employ an electronic switch that is responsive to the full range of power to the load.

What is claimed is:
1. A power control system comprising:
   a. a power control device;
   b. first and second light transmission means;
   c. a light controller;
   d. said power control device including a light generator, a light sensitive device and an electronic switch;
   e. the output of said light generator being applied to the input of said light controller by said first light transmission means;
   f. the output of said light controller being operatively connected to the input of said light sensitive device by said second light transmission means;
   g. the output control signal of said light sensitive device being operatively connected to one input of said electronic switch;
   h. a power line operatively connected to another input of said electronic switch whereby said power output of said electronic switch is controlled as a function of the control signal applied to said one input thereof;
   i. said light controller including light controlling means for controlling the light transmitted from said first light transmission means to said second light transmission means;
   j. said first and second light transmission means are elongated fiber optic elements;
   k. said light controller and light transmission means are remotely positioned from said power control device; and
   l. said remotely positioned light controller is placed in an atmosphere that reacts to electrical arcing.
2. A power control system comprising:
   a. a power control device;
   b. first and second light transmission means;
   c. a light controller;
   d. said power control device including a light generator, a light sensitive device and an electronic switch;
   e. the output of said light generator being applied to the input of said light controller by said first light transmission means;
   f. the output of said light controller being operatively connected to the input of said light sensitive device by said second light transmission means;
   g. the output control signal of said light sensitive device being operatively connected to one input of said electronic switch;

h. a power line operatively connected to another input of said electronic switch whereby said power output of said electronic switch is controlled as a function of the control signal applied to said one input thereof;
i. said light controller including light controlling means for controlling the light transmitted from said first light transmission means to said second light transmission means;
j. said first and second light transmission means are elongated fiber optic elements;
k. said light controller and light transmission means are remotely positioned from said power control device;
l. said light controller means includes first and second polarized elements; and
m. means for rotating said first polarized element with respect to said second polarized element.

3. A power control system comprising:
a. a power control device;
b. first and second light transmission means;
c. a light controller;
d. said power control device including a light generator, a light sensitive device and an electronic switch;
e. the output of said light generator being applied to the input of said light controller by said first light transmission means;
f. the output of said light controller being operatively connected to the input of said light sensitive device by said second light transmission means;
g. the output control signal of said light sensitive device being operatively connected to one input of said electronic switch;
h. a power line operatively connected to another input of said electronic switch whereby said power output of said electronic switch is controlled as a function of the control signal applied to said one input thereof;
i. said light controller including light controlling means for controlling the light transmitted from said first light transmission means to said second light transmission means;
j. said first and second light transmission means are elongated fiber optic elements;
k. said light controller and light transmission means are remotely positioned from said power control device;
l. said light controller means includes a variable opaque light filter; and
m. means for variably positioning said filter to modulate the light transmitted from said first light transmission means to said second light transmission means.

* * * * *